United States Patent
Kubo et al.

(10) Patent No.: US 6,842,626 B1
(45) Date of Patent: Jan. 11, 2005

(54) PORTABLE CELLULAR PHONE

(75) Inventors: Tetsuya Kubo, Kanagawa (JP); Koichi Yamamoto, Kanagawa (JP); Akinori Ohira, Kanagawa (JP); Yukinari Inoue, Shizuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 333 days.

(21) Appl. No.: 09/687,558

(22) Filed: Oct. 13, 2000

(30) Foreign Application Priority Data

Oct. 15, 1999 (JP) .......................................... 11-294010

(51) Int. Cl.[7] .............................................. H04M 1/00
(52) U.S. Cl. ............... 455/550.1; 455/90.3; 455/575.1; 455/575.4; 455/575.8; 455/95; 455/100; 455/575.6; 379/433.12; 379/433.13
(58) Field of Search ......................... 455/550, 90, 100, 455/575, 95, 550.1, 90.3, 575.1, 575.4, 575.8, 575.6; 379/433.12, 433.13

(56) References Cited

U.S. PATENT DOCUMENTS

| | | | | |
|---|---|---|---|---|
| 5,251,329 A | * | 10/1993 | Takagi et al. | 455/572 |
| 5,638,441 A | * | 6/1997 | Hattori et al. | 379/433.13 |
| 5,793,619 A | * | 8/1998 | Deguchi | 361/814 |
| 5,896,277 A | * | 4/1999 | Leon et al. | 361/814 |
| 5,956,625 A | | 9/1999 | Hansen et al. | |
| 6,073,027 A | * | 6/2000 | Norman et al. | 455/550 |
| 6,151,485 A | * | 11/2000 | Crisp | 455/90 |
| 6,256,481 B1 | * | 7/2001 | Jeong et al. | 455/90 |
| 6,370,362 B1 | * | 4/2002 | Hansen et al. | 455/90 |
| 6,463,262 B1 | * | 10/2002 | Johnson et al. | 455/90 |
| 6,496,181 B1 | * | 12/2002 | Bomer et al. | 345/167 |

FOREIGN PATENT DOCUMENTS

| | | |
|---|---|---|
| GB | 2 310 560 | 8/1997 |
| GB | 2 349 292 | 10/2000 |
| JP | 9-247252 | 9/1997 |

OTHER PUBLICATIONS

International Patent, Publication No. WO 99/12322, Radiotelephone with Sliding Acoustic Member, Mar. 1999.

* cited by examiner

*Primary Examiner*—Marceau Milord
(74) *Attorney, Agent, or Firm*—Pearne & Gordon LLP

(57) ABSTRACT

A portable cellular phone comprising a case body and a sliding cover is disclosed. The case body includes an operating section and stopper portions. The sliding cover covers the operating section of said case body and is slidably supported on said case body. The stopper portions of the case body restrict a sliding range of said sliding cover. The sliding cover is mounted and detached with respect to said case body by applying an outer force to the sliding cover in a direction perpendicular to a sliding direction when the sliding cover is positioned at a specific position within the sliding range. When the sliding cover is mounted, one of locking portions of the sliding cover is engaged with one of locking portions of the case body, and the other locking portion of the sliding cover is aligned in position on the other locking portion of the case body. The sliding cover is fit to the case body by applying an outer force.

3 Claims, 6 Drawing Sheets

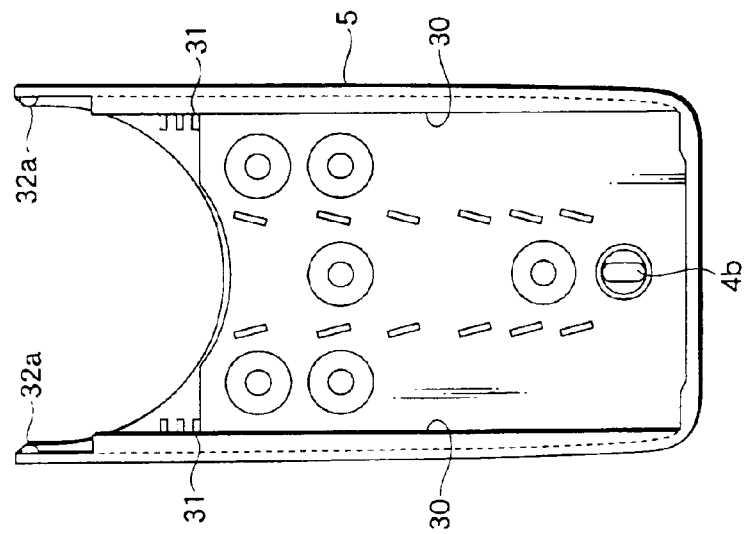
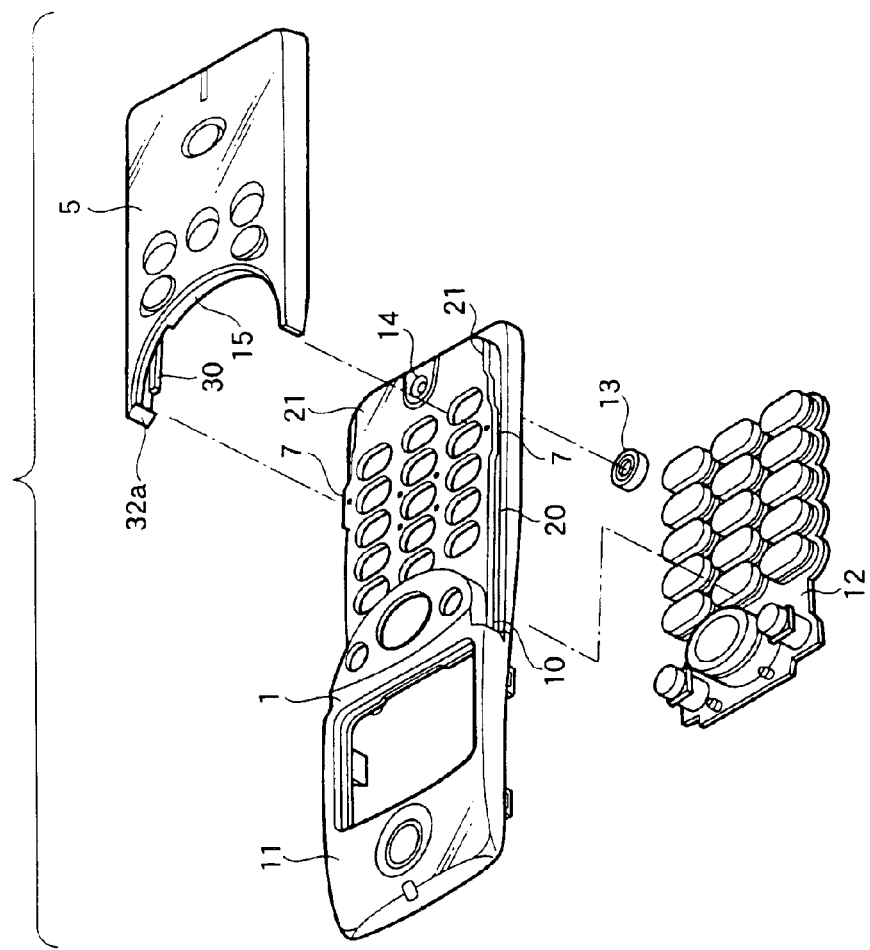
FIG.2(a)
FIG.2(b)

FIG.5(a)
FIG.5(b)
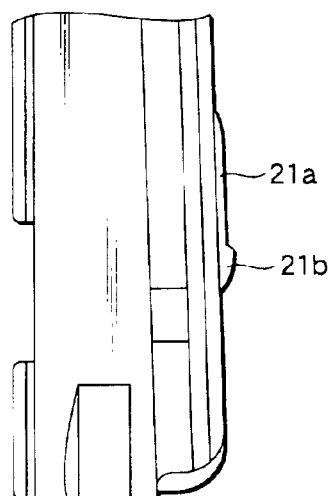
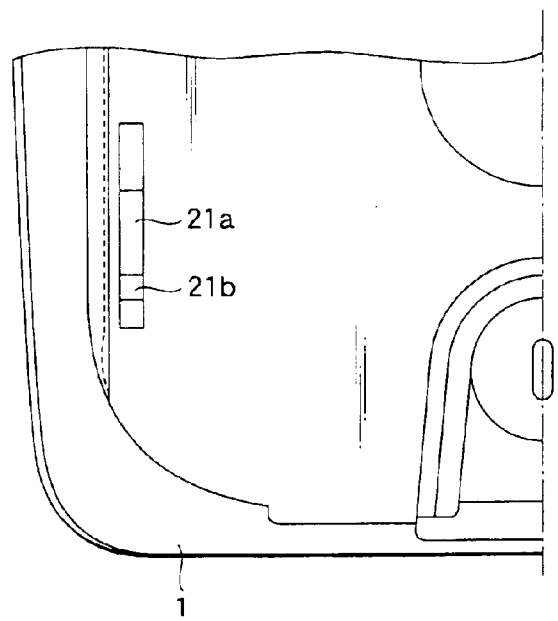

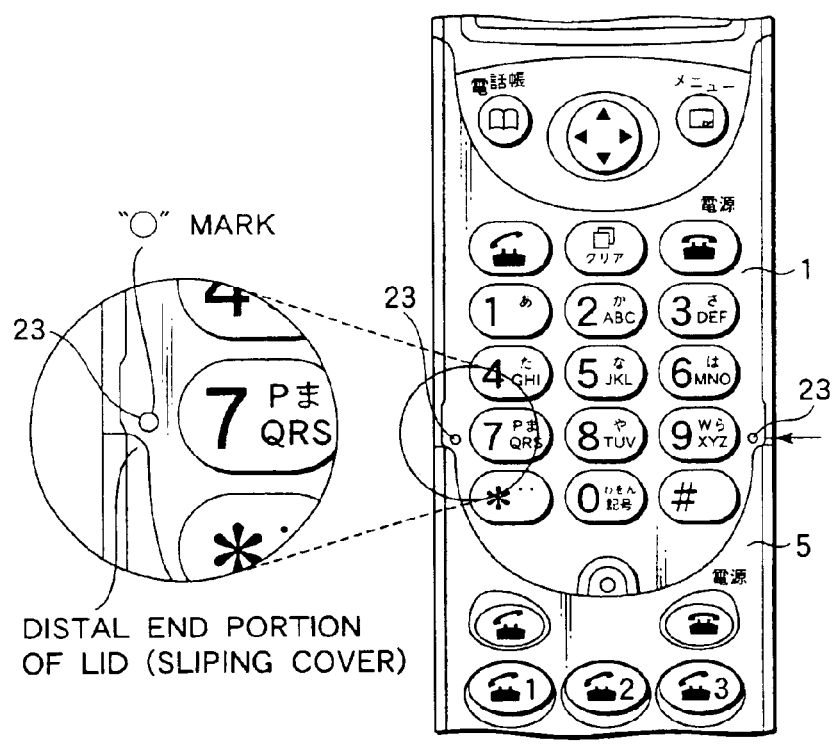

PORTABLE CELLULAR PHONE

BACKGROUND OF THE INVENTION

1. Field of the Invention

The present invention relates to a mobile telephone set portable cellular phone including a terminal of a PHS (Personal Handyphone System), and more particularly to the portable cellular phone of a structure wherein a sliding cover is aligned in position and fitted from the above.

2. Description of the Related Art

In the conventional portable cellular phone, there has been employed such a structure that a key operating section is covered with a foldable lid or a rotatable lid in order to downsize a handset for carrying and in order to protect key operation. Recently, a sliding cover which is slidingly opened and closed to cover the key operating section has been locally put in actual use.

For example, as disclosed in Japanese Unexamined Patent Publication No. JP-A-9-247252, the sliding cover is employed to cover or to protect an operating face of the telephone set while the telephone is not operated. Therefore, on occasion of using the telephone, the sliding cover is to be opened to deal with transmission and reception of correspondences.

In the above publication, there is disclosed a structure wherein the sliding cover is opened for transmitting and receiving the correspondences, and communication is effected through a voice transmitting section provided in a lowermost part of the sliding cover. Therefore, it is necessary to electrically connect the voice transmitting section incorporated in the sliding cover with the case body, which will make the structure complicated, and mounting of the sliding cover will become annoying. If the sliding cover has been detached, a user is unable to mount the sliding cover by himself.

SUMMARY OF THE INVENTION

The invention has been made in order to solve the above problems of the prior art, and it is an object of the invention to provide a portable cellular phone of such a structure that there will be least trouble in mounting the sliding cover on the portable cellular phone, and the user can easily fit the sliding cover even though it has been accidentally detached.

According to the invention, a portable cellular phone which comprises a case body and a sliding cover adapted to cover an operating section of the case body and slidably supported on the case body, wherein the case body is provided with stopper portions for restricting a maximum sliding range of the sliding cover, and the sliding cover is so constructed as to be mounted and detached with respect to the case body, by applying an outer force to the sliding cover in a direction perpendicular to a sliding direction, in a state where the sliding cover is positioned at a specific position within the sliding range restricted by the stopper portions.

With this structure, there will be least trouble in mounting the sliding cover on the telephone set, and the user can easily fit the sliding cover even though it has been accidentally detached.

Preferably, the locking portions are provided for the alignment in position on the portable cellular phone.

With this structure, there will be least trouble in mounting the sliding cover on the telephone set, and the user can easily fit the sliding cover by means of the locking portions even though it has been accidentally detached.

It is also preferable that the case body is provided with a pair of locking portions arranged on laterally opposite sides of a sliding direction for keeping the sliding cover in a locked open state, while the sliding cover is provided with a pair of sliding cover locking portions, whereby on occasion of mounting the sliding cover, one of the sliding cover locking portions is engaged with one of the locking portions of the case body and the other is aligned in position on the other locking portion of the case body, and an outer force is applied thereby to mount the sliding cover on the case body.

With this structure, there will be least trouble in mounting the sliding cover on the telephone set, and even though it has been accidentally detached, the user can easily fit the sliding cover to the case body by a simple work of applying an outer force to a part of the sliding cover having the other of the locking portions, in a state where one of the locking portions respectively provided on the case body and the sliding cover are engaged and positioned.

Further, it is preferable that marks are provided on the case body near the locking portions for the alignment in position.

With this structure, there will be least trouble in mounting the sliding cover on the telephone set, and the user can easily fit the sliding cover by positioning the sliding cover on the case body by means of the marks provided near the locking portions, even though it has been accidentally detached.

According to the present invention, a method of mounting a sliding cover for a portable cellular phone comprises a case body having a key operating section, a voice receiving section, and a voice transmitting section, and a sliding cover provided with a U-shaped cutout for covering the key operating section, wherein on occasion of mounting the sliding cover, one of distal ends of the sliding cover is aligned in position on one of marks provided on the case body, while the other end is aligned in position on the other of the marks provided on the case body, and then, an outer force is applied from the above thereby to mount the sliding cover on the case body.

With this structure, there will be least trouble in mounting the sliding cover on the telephone set, and the user can easily fit the sliding cover even though it has been accidentally detached.

BRIEF DESCRIPTION OF THE DRAWINGS

FIG. 2(a) is an exploded perspective view showing the structure of the portable cellular phone according to the embodiment of the invention.

FIG. 2(b) is a back view of the sliding cover of the portable cellular phone according to the embodiment of the invention.

FIG. 5 is an enlarged view of a part of a stopper portion on a case body of the portable cellular phone according to the embodiment of the invention.

FIG. 7(a) is a front view showing a mark indicated near the locking portion on the case body of the portable cellular phone according to the embodiment of the invention.

FIG. 7(b) is an enlarged view of a part showing the mark indicated near the locking portion on the case body of the portable cellular phone according to the embodiment of the invention.

DETAILED DESCRIPTION OF THE PREFERRED EMBODIMENTS

Mode for carrying out the invention will be described hereinafter with referring to FIGS. 1 to 7.

Figure 1C:
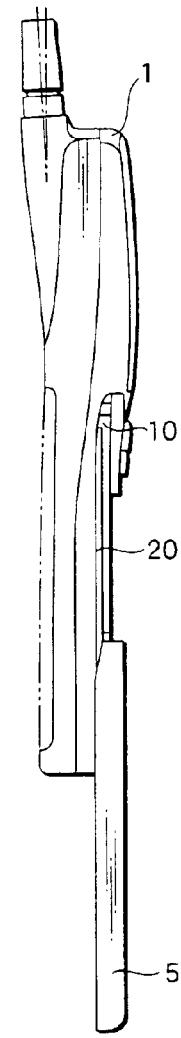
FIG. 1(c) is a side view showing the structure of the portable cellular phone according to the embodiment of the invention.
Figure 1B:
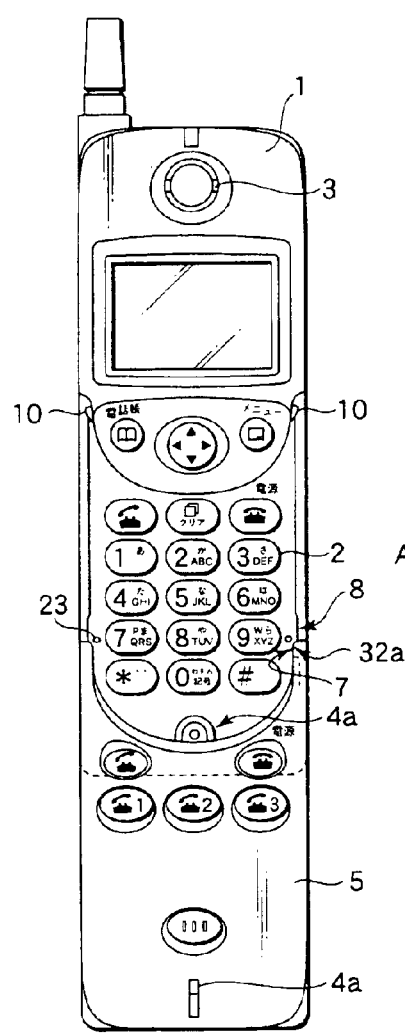
FIG. 1(b) is a plan view showing the structure of the portable cellular phone according to the embodiment of the invention in a state where a sliding cover is open.
Figure 1A:
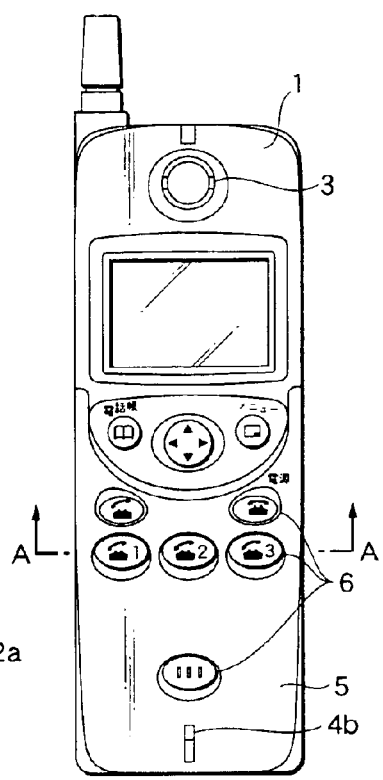
FIG. 1(a) is a plan view showing a structure of a portable cellular phone according to an embodiment of the invention in a state where the sliding cover is closed.

FIGS. 1(a) to 1(c) are plan views and a side view showing a structure of a portable cellular phone according to an embodiment of the invention in which a sliding cover 5 which is slidable with respect to a case body 1 is provided. FIG. 1(a) is a front view of the telephone set in a state where the sliding cover 5 is closed, FIG. 1(b) is a front view of the same in a state where the sliding cover 5 is opened, and FIG. 1(c) is a side view of the same in the state where the sliding cover 5 is opened.

FIG. 2(a) is an exploded perspective view of the portable cellular phone according to the embodiment of the invention, in which only the sliding cover 5 having a U-shaped cutout 15, an upper case 11, a key sheet 12, and a voice transmitting unit (a microphone) 13 are shown. FIG. 2(b) is a back view of the sliding cover 5.

The structure of the portable cellular phone will be briefly explained referring to FIGS. 1(a) to 2(b).

The case body 1 is provided with a key operating section 2, a voice receiving section 3, a voice transmitting section 4 (including a first voice transmitting hole 4a and a second voice transmitting hole 4b).

As shown in FIG. 2(a), the case body 1 includes rail portions 20 for slidably supporting the sliding cover 5, stopper portions 21 to be abutted against the sliding cover 5 to restrict a maximum sliding range of the sliding cover 5, and upper locking portions 10 and lower locking portions 7 on the case body as the locking portions on a side of the case body for positioning the sliding cover 5.

As shown in FIG. 2(b), the sliding cover 5 includes rail portions 30 which are adapted to engage with the rail portions 20 provided on the case body 1, stopper projections 31 as stopper portions, and locking claws 32a as locking portions 32 on a side of the sliding cover for positioning the sliding cover 5 with respect to the case body 1, so that the sliding cover 5 can be slid from the state as shown in FIG. 1(a) to the state as shown in FIG. 1(b).

In the state where the sliding cover 5 is closed as shown in FIG. 1(a), the locking claws 32a of the sliding cover 5 are engaged with and positioned on the upper locking portions 10 of the case body 1 by resilient force, and the voice transmitting hole 4b of the sliding cover 5 is positioned on the voice transmitting unit 13. Accordingly, the user can transmit his/her voice by way of the overlapped voice transmitting hole 4b and the voice transmitting hole 4a with the sliding cover 5 kept closed.

In the state where the sliding cover 5 is open as shown in FIG. 1(b), the locking claws 32a of the sliding cover 5 are engaged with and positioned on the lower locking portions 7 of the case body 1 by resilient force, and the voice transmitting hole 4a of the voice transmitting unit 13 is exposed to an exterior of the sliding cover 5 so that the user can transmit his/her voice by way of the voice transmitting hole 4a. When an outer force in a sliding direction is exerted to force the sliding cover 5 to further slide, the stopper projections 31 of the sliding cover 5 are abutted against the stoppers 21 on the case body 1 to restrict the maximum sliding range of the sliding cover 5 so that the sliding cover may not slide furthermore.

Figure 3:
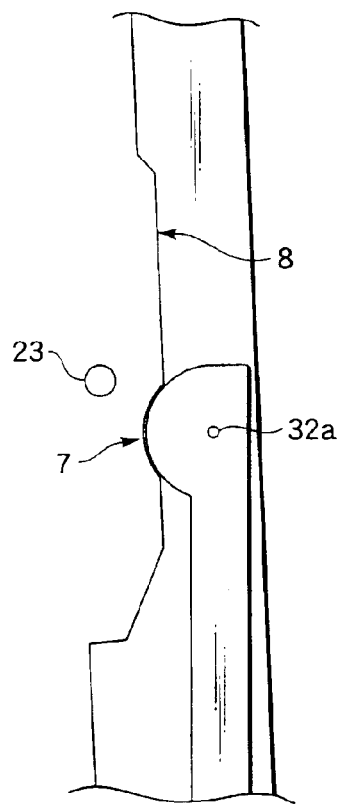
FIG. 3 is an enlarged view showing a locking portion of the portable cellular phone according to the embodiment of the invention in an engaged state.
Figure 4:
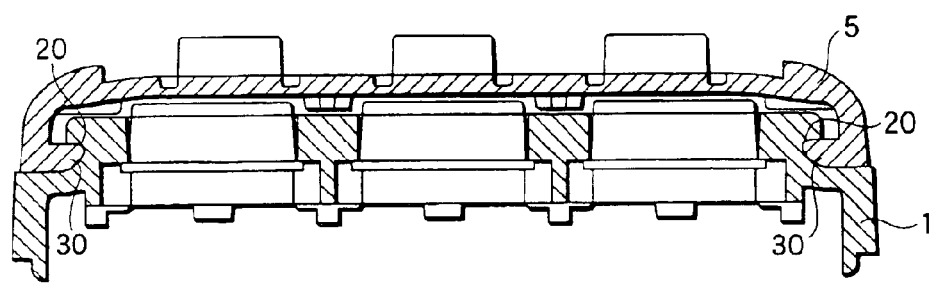
FIG. 4 is a sectional view showing the structure of the portable cellular phone according to the embodiment of the invention.

FIG. 3 is an enlarged view of a part showing the locking claw 32a and the lower locking portion 7 in an engaged state. FIG. 4 is a sectional view of the portable cellular phone taken along a line A—A in FIG. 1(a). On end edges of the sliding cover 5 along the rail portions 20 of the case body 1, are provided rail portions 30 which are inwardly curved. The rail portions 30 are adapted to engage with the rail portions 20 of the case body 1 and the sliding cover 5 is slid with respect to the case body 1 with keeping the engaged state.

FIG. 5(a) is an enlarged side view of a part of the stopper portion 21 which extends longitudinally along the case body 1, and FIG. 5(b) is an enlarged front view of the same. The stopper portion 21 has a low projecting area 21a and a highest projecting area 21b continuing therefrom as shown in FIG. 5(a). The low projecting area 21a serves to prevent rattling of the sliding cover 5.

When the sliding cover 5 is slid in an opening direction, the stopper projection 31 of the sliding cover overrides on the low projecting area 21a to eliminate a gap between the rail portion 20 of the case body 1 and the rail portion 30 of the sliding cover 5, and thus, the rattling of the sliding cover will be avoided.

When the stopper projection 31 of the sliding cover is abutted against the highest projecting area 21b, a further movement of the sliding cover is blocked. By forming a shape of the highest projecting area 21b to be high and rigid, the sliding cover 5 can be such that it will not be detached even though a strong force is applied in the sliding direction. On the other hand, the highest projecting area 21b can be in such a shape that the sliding cover 5 will override the area 21b when a predetermined force is applied, thereby to detach the sliding cover 5, thus avoiding a damage on the stopper portion 21 of the case body.

Figure 6A:
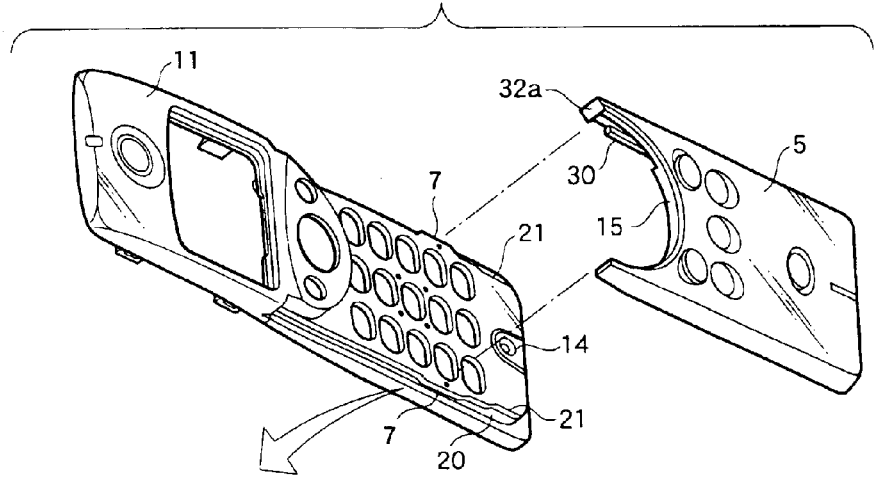
FIG. 6(a) is a perspective view of the portable cellular phone according to the embodiment of the invention in a state where the sliding cover is removed.
Figure 6B:
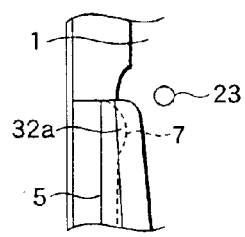
FIG. 6(b) is an enlarged view of a part of the locking portion of the portable cellular phone according to the embodiment of the invention.

In order to mount the sliding cover 5 which has been detached or has been detached from the beginning on the case body 1, one of the locking claws 32a of the locking portions 32 of the sliding cover 5 is engaged with the lower locking portion 7 of the case body 1 as a first step, as shown in FIG. 6(a) and FIG. 6(b). Then, as a second step, as shown in a sectional view of FIG. 6(c), the other locking claw 32a which is not yet engaged is positioned on the other of the lower locking portions 7 of the case body and a force is applied to the sliding cover 5 toward the case body 1. As a result, the rail portions 30 of the sliding cover 5 are elastically deformed and slide along outer surfaces of the rail portions 20 of the case body 1 to be fitted therein as shown in a sectional view of FIG. 6(d).

Figure 6C:
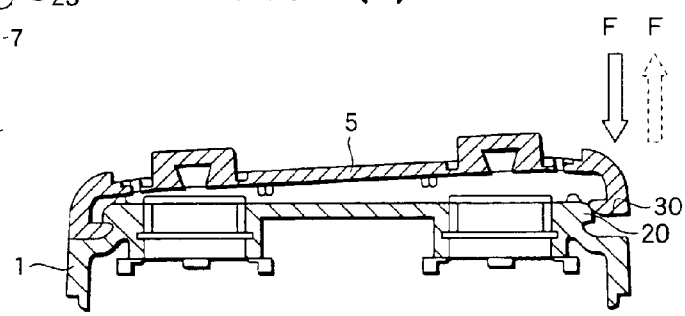
FIG. 6(c) is a sectional view of the portable cellular phone according to the embodiment of the invention in a state where one of the locking portions engaged.
Figure 6D:
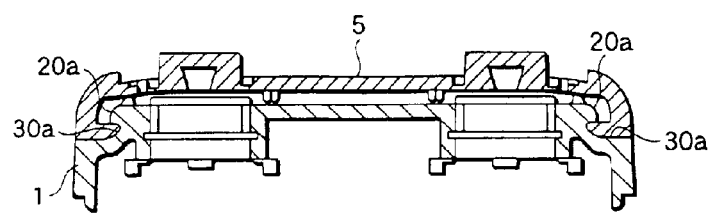
FIG. 6(d) is a sectional view of the portable cellular phone according to the embodiment of the invention in a state where the sliding cover is assembled to the case body.

For enabling the sliding cover 5 to be smoothly mounted on the case body 1, contacting portions of the rail portions 20 of the case body 1 and contacting portions of the rail portions 30 of the sliding cover 5 which are abutted against each other are respectively provided with chamfered areas 20a, 30a as shown in FIGS. 6(c) and 6(d), so that the contact parts can easily slide. Thus, the sliding cover 5 can be assembled to the case body with a relatively small force.

Although not explained in the above description of the assembling steps, there are integrally molded concave marks 23 on a surface of the case body 1 near the lower locking portions 7, as shown in FIGS. 6(a), 6(b) and 7. On occasion of manually assembling the sliding cover to the case body, the locking claws 32a of the sliding cover 5 can be positioned on the lower locking portions 7 setting these marks 23 as targets. The assembling work can be reliably conducted in this manner.

In order to manually detach the sliding cover 5 which has been once mounted on the case body 1, the detaching operation can be done by conducting the steps of mounting the sliding cover 5 on the case body 1 as described referring to FIGS. 6(a) to 6(d) in a reverse order.

Describing in detail, in a state where the locking claws 32a of the sliding cover 5 are positioned on the lower locking portions 7 as shown in FIG. 6(d), a force is applied to the rail portion 30 of the sliding cover 5 which is in engagement with the rail portion 20 of the case body 1 adjacent to one of the locking claws 32a in a direction of detaching the rail portion 20 from the case body 1.

While the locking claws 32a of the sliding cover 5 is positioned on the lower locking portions 7, the sliding cover 5 projects from the case body 1. Therefore, by clamping the projecting sliding cover by hand and twisting, the force can be applied to the rail portion 30 which is in engagement with the rail portion 20 of the case body 1 in a direction of detaching it from the case body 1.

By applying the force in this manner, the rail portion 30 of the sliding cover 5 is detached by overriding the rail portion 20 of the case body 1 while it is elastically deformed, as shown in FIG. 6(c). Therefore, by conducting the steps in the reverse order from the assembling steps as shown in FIG. 6(b), and then in FIG. 6(a), the other rail portion 30 of the sliding cover 5 can be detached from the other rail portion 20 of the case body 1, and the sliding cover 5 can be detached from the case body 1.

In this embodiment of the invention, in order to conduct the mounting and the detaching works of the sliding cover 5 with respect to the case body 1, the sliding cover 5 and the case body 1 are positioned with respect to each other by means of the locking portions, and the outer force is applied in a direction perpendicular to the sliding direction.

For this reason, the sliding cover 5 will not be brought into contact with the highest projecting area 21b of the stopper projection of the case body 1 during the mounting and the detaching works. Therefore, even though the projecting amount of the highest projecting area 21b of the stopper projection of the case body 1 is set to be high so that the sliding cover 5 may not tend to be detached in the sliding direction, the sliding cover 5 can be easily mounted and detached with respect to the case body 1 irrespective of the height and the strength of the highest projecting area.

As described above, the portable cellular phone according to the present invention has the structure in which the case body is provided with the stopper portions 21 for restricting the maximum sliding range of the sliding cover, and by applying an outer force to the sliding cover 5 in a direction perpendicular to the sliding direction, in the state where the sliding cover 5 is positioned at a specific position within the sliding range restricted by the stopper portions, the sliding cover 5 can be mounted and detached without bringing the sliding cover into contact with the stopper portions. Therefore, the invention has such an effect that even though the rigid stopper portions are provided on the case body so that the sliding cover which has been once mounted may be hardly detached, there will be least trouble in mounting the sliding cover on the telephone set, and the user can easily fit the sliding cover.

In addition, the portable cellular phone according to the present invention has such an effect that because the locking portions are provided for the alignment in position, the user can mount and detach the sliding cover with respect to the body more easily and reliably by means of the locking portions.

Further, the portable cellular phone according to the present invention has such an effect that with a simple work of applying an outer force to the sliding cover at a side provided with the other locking portion, in the state where one pair of the pairs of the locking portions respectively provided on the case body and the sliding cover are engaged for the alignment in position, the user can easily mount the sliding cover on the case body.

The portable cellular phone according to the present invention also has such an effect that because the marks are provided near the locking portions for the alignment in position, the alignment can be easily performed and the user can more easily mount the sliding cover.

Further, the portable cellular phone according to the present invention attains such an effect that by conducting the steps of positioning one of the distal ends of the sliding cover on one of the marks provided on the case body, positioning the other distal end on the other of the marks provided on the case body, and then, applying an outer force from the above thereby to mount the sliding cover, there will be least trouble in mounting the sliding cover on the telephone set, and the user can easily fit the sliding cover even though it has been accidentally detached.

Moreover, the effect of the invention that the sliding cover can be easily mounted and detached with respect the case body will satisfy the users' requests that they would like to use the telephone set as an ordinary portable cellular phone in which the sliding cover is completely removed from the case body to expose the operating section when input operations of ten keys are frequently repeated.

Further, the invention can attain such a spillover effect that when a user would like to use a sliding cover with a floral print seal stuck or with a unique design painted, or a see-through cover (so-called skeleton cover) through which lights of the ten keys lit on occasion of receiving a message can be seen, as recently in fashion, he can prepare a plurality of the sliding covers of the same shape beforehand and select one of the sliding covers according to time, place and object to fit it to the case body.

What is claimed is:

1. A portable cellular phone comprising:
   a case body including rail portions, stopper portions, and locking portions; and
   a sliding cover including rail portions, stopper portions, and locking portions, the portions of said sliding cover respectively corresponding the rail portions, the stopper portions, and the locking portions of said case body, wherein the stopper portions of said case body restricts a sliding range of said sliding cover, and the locking portions of said case body positions said sliding cover at a specific position within the sliding range restricted by the stopper portions of said case body, and wherein said sliding cover is mounted and detached with respect to said case body by applying an outer force to said sliding cover in a direction perpendicular to a sliding direction with the rail portions of said sliding cover being elastically deformed when the rail portions of said sliding cover are overlapped on the rail portions of said case body, and the locking portions of said sliding cover are abutted against the locking portions of said case body to position said sliding cover.

2. The portable cellular phone according to claim 1, wherein a mark is provided on said case body near the locking portion of said case body for alignment in position.

3. The portable cellular phone according to claim 1, wherein a mark is provided on said case body near the locking portion of said case body for alignment in position.

* * * * *